United States Patent
Keyser (12)

(10) Patent No.: US 6,218,174 B1
(45) Date of Patent: Apr. 17, 2001

(54) PURIFICATION OF FLUIDS AND CONTROL OF SOLUTE CONCENTRATIONS THROUGH SELECTIVE DEGASIFICATION

(76) Inventor: Gene E. Keyser, 3311 Scrub Oak La., Jacksonville, FL (US) 32223

( * ) Notice: Subject to any disclaimer, the term of this patent is extended or adjusted under 35 U.S.C. 154(b) by 0 days.

(21) Appl. No.: 09/310,665

(22) Filed: May 12, 1999

(51) Int. Cl.[7] ....................................... C12S 5/00
(52) U.S. Cl. ................ 435/266; 435/289.1; 423/232; 95/160; 95/163; 95/175; 96/193; 96/323
(58) Field of Search ................ 435/266, 289.1; 422/168; 423/210, 220, 232, 233, 240 R, 241; 95/156, 163, 160, 169, 172, 175, 176, 177, 241, 262, 266; 96/193, 197, 355, 323

(56) References Cited

U.S. PATENT DOCUMENTS

| | | | |
|---|---|---|---|
| 2,214,368 | * | 9/1940 | Greensfelder et al. . |
| 3,038,285 | * | 6/1962 | Mavrovic . |
| 3,116,999 | * | 1/1964 | Armbruster . |
| 3,731,801 | | 5/1973 | Hess et al. ............................. 210/56 |
| 3,951,753 | | 4/1976 | Roller ..................................... 203/7 |
| 4,042,493 | | 8/1977 | Matsch et al. ........................... 210/6 |
| 4,084,346 | | 4/1978 | Stengel et al. .......................... 47/1.4 |
| 4,116,834 | | 9/1978 | King .................................. 210/96 R |
| 4,141,822 | | 2/1979 | Levin et al. .............................. 210/6 |
| 4,152,218 | | 5/1979 | Narita et al. ........................... 203/10 |
| 4,216,089 | * | 8/1980 | Boon et al. . |
| 4,247,371 | | 1/1981 | Roller ..................................... 203/7 |
| 4,277,343 | | 7/1981 | Paz ...................................... 210/614 |
| 4,402,833 | | 9/1983 | Bennett et al. ...................... 210/667 |
| 4,406,867 | * | 9/1983 | Marcinkowsky et al. . |
| 4,407,665 | * | 10/1983 | Lasater . |
| 4,460,470 | | 7/1984 | Reimann .............................. 210/605 |
| 4,532,045 | | 7/1985 | Littmann .............................. 210/668 |
| 4,670,157 | | 6/1987 | Nicksic ................................ 210/696 |
| 4,877,536 | | 10/1989 | Bertness et al. ..................... 210/712 |
| 4,956,094 | | 9/1990 | Levin et al. .......................... 210/625 |
| 5,013,442 | | 5/1991 | Davis et al. .......................... 210/614 |
| 5,094,752 | | 3/1992 | Davis et al. .......................... 210/614 |
| 5,541,056 | | 7/1996 | Huntley et al. ........................... 435/3 |
| 5,609,838 | | 3/1997 | Neuman et al. ................... 423/206.1 |
| 5,766,270 | | 6/1998 | Neuman et al. .................... 23/302 T |
| 5,958,238 | | 8/1999 | Langerwerf ......................... 210/603 |
| 6,048,513 | * | 4/2000 | Quarderer et al. . |

\* cited by examiner

*Primary Examiner*—William H. Beisner
(74) *Attorney, Agent, or Firm*—Testa, Huwitz & Thibeault, LLP (57) ABSTRACT

Degassing is accomplished by driving a gas-containing solution to a subatmospheric pressure approximately equal to the solution vapor pressure, and maintaining the subatmospheric pressure notwithstanding evolution of gas from the solution. This may be accomplished using a vacuum tower arrangment whereby a column of the gas-containing liquid is drawn to the maximum physically attainable height. So long as the vacuum is coupled to the liquid column above this height (generally on the order of 34 feet, depending on the ambient temperature and the composition of the liquid), the liquid will not be drawn into the vacuum, which creates a non-equilibrium region of extremely low pressure above the liquid that liberates dissolved gases. Moreover, liquid introduced into the low-pressure region above the column will fall onto the column without entering the vacuum system. As a result, the region above the column represents an interaction region within which gas will be stripped from an incoming liquid as it falls toward the column.

28 Claims, 5 Drawing Sheets

PURIFICATION OF FLUIDS AND CONTROL OF SOLUTE CONCENTRATIONS THROUGH SELECTIVE DEGASIFICATION

FIELD OF THE INVENTION

The present invention relates to treatment of liquids and gases, and in particular to control of dissolved gases, ions, and other solutes in aqueous solutions.

BACKGROUND OF THE INVENTION

Numerous applications, ranging from industrial processes to wastewater management, require alteration or control of gaseous byproducts or dissolved constituents in aqueous mixtures. For example, water treatment frequently involves removal ionizing gases such as ammonia or hydrogen sulfide. This may be accomplished by air stripping, i.e., exposing the liquid to large volumes of air to create non-equilibrium conditions that result in the evolution of the unwanted gases. This practice can be self-defeating if the air itself contains one or more of the constituents sought to be removed, or when the dissolved gas or a bulk liquid component reacts with airborne oxygen or carbon dioxide. Moreover, the bulk solution conditions may complicate removal of gas due to ionization in solution.

This occurs, for example, in cases where the solution must be made basic to enhance the partial pressure of the unwanted dissolved gas. When removing ammonia from a liquid stream, general practice is to elevate the pH of the feed solution to at least 9 (and typically to 11) to shift the form of the dissolved ammonia from ammonium ion, $NH_4^+$, to free ammonia, $NH_3$. But the carbon dioxide content of the air used to strip the dissolved free ammonia itself reacts with the basic solution, imparting acidity that results in the need for additional base if complete ammonia removal is to be achieved.

Essentially the converse is true in the removal of $H_2S$ from aqueous solution. At neutral pH values, hydrogen sulfide is ionized in solution as monohydrogen sulfide, $HS^-$. Air stripping under these conditions will remove 5–25% of the dissolved sulfur species, representing the amount of the unionized species in equilibrium at neutral pH. However, the sulfide ion in solution reacts rapidly with oxygen to generate disulfide and higher sulfur species that are not gases at normal temperatures and conditions. The more air that is used, the more oxidation will take place, and the less total sulfur that will be removed from solution.

Consequently, air stripping and similar processes that utilize atmospheric exposure can never reduce the concentrations of certain reactive constituents below a threshold level due to impurities in the air itself. These impurities can react with the liquid to be treated to oppose the very process used to effect treatment. In the cases of ammonia or hydrogen sulfide, the stripping air may be free of the gas to be removed and the partial pressure of the gaseous impurity essentially driven to zero, but only with large volumes of air and measures that achieve very high degrees of liquid-gas contact. More obvious limitations arise when the impurities sought to be removed (e.g., $CO_2$) are themselves present in the air used for stripping, which thereby imposes a floor on the amount of the impurity that may be removed. Unless the inherent content of $CO_2$ is first removed from the stripping air, the carbon dioxide content of the solution to be treated cannot be reduced below the partial pressure equilibrium point of the carbon dioxide in the air.

DESCRIPTION OF THE INVENTION

BRIEF SUMMARY OF THE INVENTION

In accordance with the present invention, subatmospheric pressures—preferably those approaching the vapor pressure of the liquid to be treated—can be used to minimize the chemical reactions opposing degasification. Surprisingly, the removal of gas can be driven essentially to completion given adequate counterions to maintain charge balance in solution.

In another aspect of the invention, removal of reactive or ionizable gases from solution in accordance with the invention is utilized to influence the solubility of other species. For example, control of pH may be achieved without the addition of compounds that would themselves impact the solubility of pH-sensitive species. The invention can also avoid the need for solubility-mediating additives that increase solids content (in water softening, for example).

In a related aspect, the solubility of one or more target species is affected first by dissolving a gas into solution and subsequently removing it. Because of the high efficiency associated with the preferred implementations, the gas is fully purged from the system following its introduction (frequently to levels below the initial conditions prior to addition of gas). In one application, dissolution of a gas increases the solubility of a target species in order to facilitate initial removal of insoluble (e.g., biological) particulates. The gas-rich filtrate is then subjected to substantially complete degasification, which drives the target species out of solution for subsequent removal.

In another related aspect, the invention is applied to solutions comprising a substance (e.g., chlorine) present as a dissolved gas ($Cl_2$) in equilibrium with at least one non-gas dissolved species (HOCl and HCl). By continuously drawing gas from solution through maintenance of subatmospheric pressure, the equilibrium is driven toward the dissolved gas, removal of which depletes the solution of the substance without addition of solids (as in the prior art).

Degasification is preferably accomplished using a vacuum tower arrangment whereby a column of the gas-containing liquid is drawn to the maximum physically attainable height. So long as the vacuum system is coupled to the liquid column above this height (generally on the order of 34 feet, depending on the ambient temperature and the composition of the liquid), the liquid will not be drawn into the vacuum, which creates a non-equilibrium region of extremely low pressure above the column. Moreover, liquid introduced into this low-pressure region will fall onto the column without entering the vacuum system. As a result, the region above the column represents an interaction zone within which gas will be stripped from an incoming liquid as it falls toward the column. Preferably, the vacuum system utilized to draw the column is based on one or more venturis, which can be part of a recirculation system that reactively utilizes, isolates, or disposes of the withdrawn gas.

In accordance with this aspect of the invention, a preferred form of entrance arrangement injects the influent into the interaction zone through a set of spiral vanes, which spin the liquid at high velocity to produce large gas-transfer rates and surface-to-volume contact ratios. The angle of approach to the spiral vanes is chosen so as to exploit the Coanda effect to maximize velocity while minimizing the pressure drop across the entrance, and to maintain a non-misting, high-surface area turnover in the interaction zone.

Another aspect of the invention involves utilizing pressure to drive a reaction facilitating separation of species in a mixed gas stream, or reactive removal of one or more gas components from the stream. This aspect of the invention may employ the nonlinear differential behavior of Henry's law with respect to the various gas components under elevated pressure conditions.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

The objectives of the present invention may be understood with reference to removal of carbon dioxide from an aqueous solution also containing sodium bicarbonate. Under ambient atmospheric pressure at equilibrium conditions, a solution of carbon dioxide, carbonic acid (dissolved and ionized carbon dioxide), and sodium bicarbonate in water exists at pH 6–6.8 (depending on temperature) when carbon dioxide is present at 0.0003 atmosphere (i.e., the typical atmospheric $CO_2$ concentration of 0.03%). This residual ambient content places a floor on the amount of $CO_2$ reduction achievable by air stripping.

If the partial pressure of carbon dioxide is increased, the pH of the solution diminishes as the concentration of carbonic acid increases. The concentration of bicarbonate in solution, however, remains unchanged because the aqueous total system carbon content increases due to the reactive dissolution of carbon dioxide. In accordance with the present invention, the total system pressure is reduced, decreasing the total carbon content in solution due to the removal of carbon dioxide. Even the carbon present in the original bicarbonate content is evolved as gaseous $CO_2$ as the equilibrium continues to shift to form sodium carbonate:

$$CO_2(aq)+H_2CO_3+NaHCO_3 \leftrightharpoons CO_2(g\uparrow)+Na_2CO_3$$

When the system pressure reaches the water vapor pressure, the dissolved carbon content is essentially all in the form of sodium carbonate in an amount one-half that represented by the original bicarbonate content (with the sodium content unchanged). The pH will approach 10.8.

In the presence of a third species (e.g. sodium orthophosphate) that does not contribute a volatile component to the equilibrium, the charge balance can be shifted entirely to this non-volatile component.

$$CO_2(aq)+H_2CO_3+NaHCO_3+NaH_2PO_4 \leftrightharpoons CO_2(g\uparrow)+Na_2HPO_4$$

As the system carbon content (including the "acid" carbon dioxide) is removed, the pH of the system rises.

In similar fashion, sodium hydrogen sulfide can be removed from a relatively neutral solution or from a basic one if sufficient counterionic species exist to accept the charge balance.

$$NaHS+NaHCO_3(excess) \leftrightharpoons H_2S(g\uparrow)+CO_2(g\uparrow)+Na_2CO_3$$

Even ammonium bicarbonate can be removed by reducing the system pressure because both both ammonia and carbon dioxide are gases at subatmospheric pressures in the presence of water:

$$NH_4HCO_3 \leftrightharpoons CO_2(g\uparrow)+NH_3(g\uparrow)+H_2O$$

More generally, any gas in solution equilibrium with other species can be removed from solution without the introduction of solids (as in the prior art), since active evacuation of the evolved gas and maintenance of subatmospheric pressure continuously drives the equilibrium to the gas form until the substance is fully depleted. Halogens, for example, are frequently used as disinfecting agents, following which they may be removed to avoid adverse health or environmental effects. In the case of chlorine, the hypochlorous acid and hydrochloric acid are in equilibrium with the dissolved gas $Cl_2$:

$$HOCl+HCl \leftrightharpoons Cl_2(g)+H_2O$$

By actively removing chlorine gas from solution, the equilibrium is driven to formation of more chlorine gas until all chlorine has been removed from solution. While ionized chorine is not removed, these species rarely pose toxicity concerns. Analogous results are obtained with other halogens, such as iodine and bromine.

The approach of the invention can also serve to solubilize or fully precipitate weakly soluble species in solution. Copper and silver, for example, are solubilized in aqueous media by the presence of ammonia, which serves as a ligand to "dissolve" the normally insoluble metal ion. In accordance with the present invention, removal of ammonia prevents chelation, allowing the normally low solubility products of ionic copper and silver comounds to cause their precipitation.

Certain bicarbonate and phosphate salts, e.g., calcium dihydrogen phosphate, ferric dihydrogen phosphate, calcium bicarbonate, ferric bicarbonate, and calcium hydroxyphosphate (hydroxyapatite) demonstrate extreme solubilities in aqueous media under certain pH conditions. In particular, elevation of the pH by the addition of sodium compounds (e.g., sodium hydroxide or a weak-acid salt such as sodium carbonate) do not cause complete precipitation of the calcium or iron salts because of the solubilizing effects of the sodium ion (or ammonium ion, if present); this is because the common-ion effect of the added carbonate or hydroxide, which would be expected to increase precipitation, is inadequate under the non-ideal solution behavior to overcome the solubilizing effect of the counterion of the common ion. Elevation of the pH by gas removal (e.g., reducing acid content through reduction of dissolved carbon dioxide) rather than by addition of counterions, however, causes the opposite effect: a marked decrease in the solubility of these species, in particular of the carbonate and phosphate salts of calcium (which are freely soluble in all proportions as the sodium salts).

The invention also offers an alternative to solubility-mediating operations that increase solids content. In water treatment and industrial boiler operations, for example, the water to be used or consumed is normally softened by replacement of the calcium and magnesium content with sodium or potassium, increasing the total dissolved solids content of the water. Another method of water softening is treatment with lime ($Ca(OH)_2$), which is sparingly soluble but elevates the pH without the common-ion effect of sodium or potassium. The dissolved calcium and magnesium bicarbonate and the dissolved carbonic acid and carbon dioxide are converted to significantly less soluble carbonates with the concurrent formation of additional calcium carbonates from the added lime. The net result is a lower total dissolved calcium content at the expense of considerable solids formation.

In accordance with the present invention, removal of carbon dioxide results in the formation of carbonate salts without addition of calcium or other species, so that the total dissolved solids content is reduced. In current practice, lime water softening units are limited by the amount of reacted solids to be removed; thus, by removing the carbon dioxide without chemical addition, the softening capacity is increased dramatically because the amount of solids produced and to be removed is diminished almost by a factor of three. Furthermore, other inherent contaminants of the water supply such as hydrogen sulfide, heavy metals (iron, copper, lead, etc.), and light hydrocarbons are removed in gaseous form or by precipitation.

In industrial applications for pretreatment of boiler water, considerable chemical content is added to prevent the precipitation of calcium, magnesium, and other alkali-metal salts. The present invention, through removal of carbon dioxide, renders the dissolved solids insoluble and amenable to withdrawal from the system by simple filtration.

Similarly, reverse-osmosis ("RO") water-purification systems presoften the water to be purified and/or add chelating chemicals that prevent precipitation of alkali-metal salts on the surface of the osmotic membrane. Presoftening and chelate addition both add dissolved solids to the water, increasing the osmotic burden or decreasing the ultimate yield of pure water. The present invention may be applied to RO applications in two stages. In a first stage, the water is acidified by addition of carbon dioxide under the high system pressures used in RO applications to prevent precipitation of the heavy-metal salts. After the first pass of RO concentration, which generates a reject or concentrate stream, this stream is subjected to reduced-pressure gas removal in accordance with the invention. As a result, the metal salts precipitate, and the filtered "reject" may be used to generate additional concentrate and/or pure water. Because the system is subtractive, rather than chemically additive, the process may be continued as long as economically attractive (i.e., to the point at which the cost of filtration of treated reject exceeds the cost of raw feed water). This approach is especially beneficial when water is in very limited supply or when a "closed-loop" system must be used to retain all of the water used.

The two-stage approach of the invention is also applicable to the removal of phosphates, which have discharge limits from water and wastewater treatment facilities. Phosphate removal is frequently employed in connection with the "mixed liquor" component of wastewater-treatment processes. This component contains biological components— i.e., microorganisms that break down complex organics into simple organics, mineralize organics, and/or change the oxidation state of nitrogen or sulfur compounds to render them environmentally acceptable or amenable to separation—and waste under treatment; phosphates build up as treatment progresses, slowing the biological processes and ultimately harming the beneficial microorganisms. Two common methods presently in use for phosphate removal generate solids far in excess of the amount originally to be removed. The processes described in U.S. Pat. Nos. 4,956,094, 4,042,498, 4,141,822, and 4,460,470, for example, cause the system of mixed liquor to become anoxic (through time and tankage), clarify to remove the biological and trash fractions, and add lime (in a manner similar to conventional softening processes utilizing lime) to remove phosphate salts and the calcium carbonate generated as a consequence of lime addition. The solution is made slightly acidic by the consumption of oxygen and the incurred carbon dioxide produced, but only to the extent of the incoming dissolved oxygen (1–5 mg/liter).

In accordance with the present invention, the mixed liquor is first acidified slightly by introduction of carbon dioxide (to pH 4–6.9, depending on temperature and pressure), which renders phosphate salts soluble and amenable to separation from the biological components of mixed liquor. Following clarification, the clear, phosphate-rich supernatant or filtrate is reduced in carbon-dioxide content through degasification, elevating the pH and thereby precipitating the previously dissolved phosphate salts (in particular calcium hydroxyphosphate). These phosphate salts are then removed by filtration or gravity clarification and the bulk water recovered for discharge. The only solids generated by the two-step process of the invention are those resulting from material already in solution. Moreover, reuse of the carbon dioxide allows especially high recovery of phosphate per pass through the system, and can be achieved with small tankage requirements.

In more general terms, the approach is applicable, for example, to phosphates, sulfates, arsenates, arsenites, and carbonates of divalent, trivalent, or tetravalent metals that are rendered soluble by addition of carbon dioxide or sulfur dioxide; and divalent or polyvalent metal salts rendered soluble by addition of ammonia to form chelation complexes.

Figure 1A:
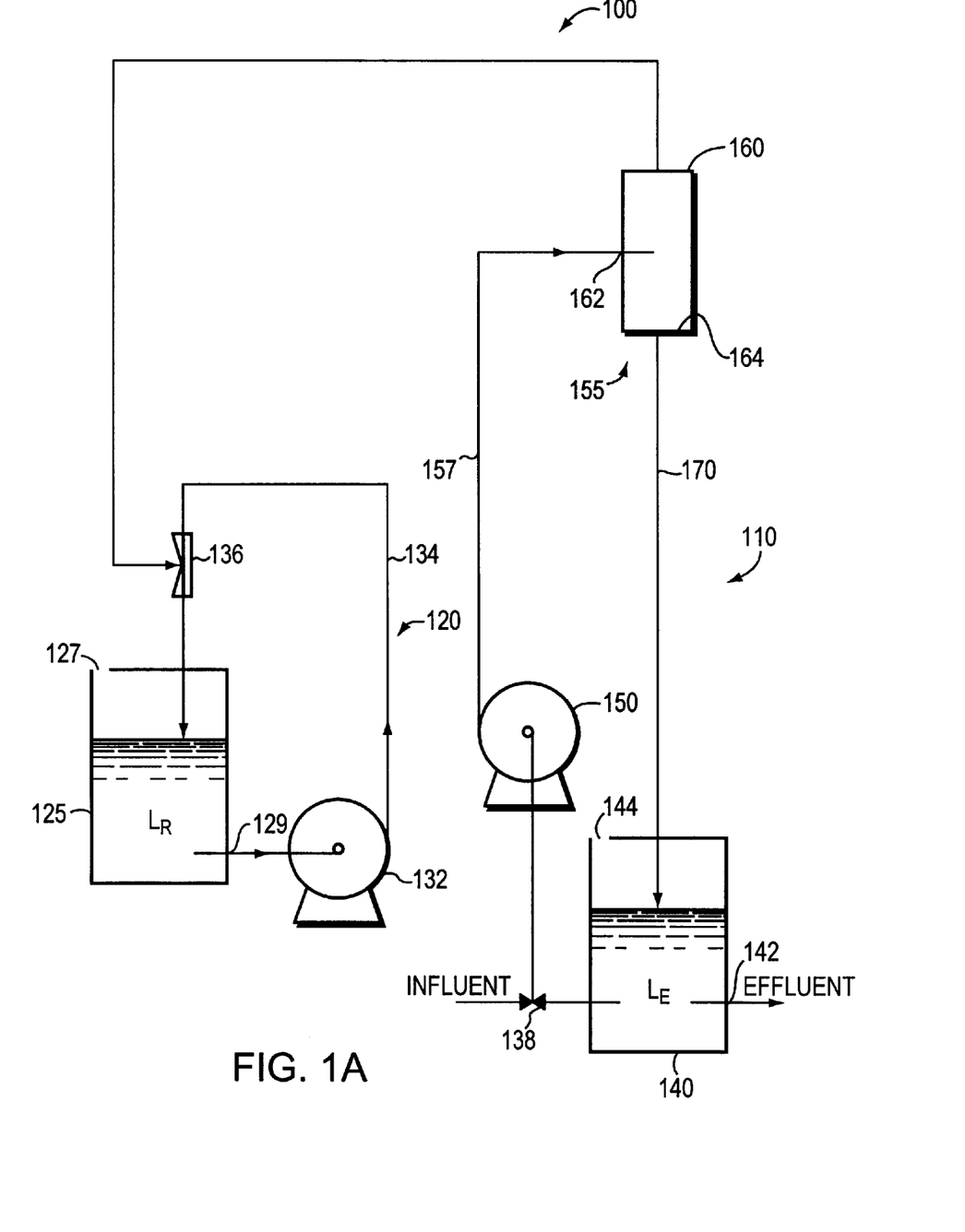
FIGS. 1A and 1B schematically illustrate gas-removal systems in accordance with the invention that operate by vacuum.

Practical embodiments of the invention, illustrating the diversity of possible mechanical implementations and applications benefiting from the disclosed approach, will now be described. With reference to FIG. 1A, a system 100 for removing gas from a liquid comprises a gas-removal subsystem 110 and a driving subsystem 120. The purpose of the latter subsystem is to provide the vacuum motive force to effect degasification. In this context it should be emphasized that the illustrated subsystem 120 represents a preferred approach; mechanical or other suitable vacuum systems not utilizing a venturi arrangement can instead be used.

Subsystem 120 comprises a vessel 125 for containing a recirculation liquid $L_R$. Vessel 125 includes a vent 127 and an outlet 129 leading to a high-speed recirculation pump 132. Pump 132 displaces the liquid $L_R$ along a flow path 134, which leads back to vessel 125 through a venturi 136. Accordingly, high-speed recirculation of liquid $L_R$ (generally at flow rates ranging from 50–400 gal/min) creates a considerable vacuum draw at venturi 136.

Gas-containing influent enters subsystem 110 through a valve or a simple Y-connector 138, a second inlet of which is in fluid communication with the interior of a second vessel 140. This vessel contains the effluent liquid $L_E$ that has been stripped of gas as described below, and degassed liquid is continually withdrawn from vessel 140 through an outlet port 142. In general, the outflow through port 142 substantially matches the flow of influent into valve 138. A vent 144 fluidly couples vessel 140 to the atmosphere.

A recirculation pump 150 pumps, via valve 138, influent and liquid $L_E$ from vessel 140 to the top of a tower assembly 155 along an entry flow path 157. Assembly 155 comprises a tower tank 160 having an inlet 162 spaced above its floor 164. A tower column pipe 170 leads back to vessel 140; preferably the level of liquid $L_E$ in vessel 140 is kept above the bottom opening of column 170, so that the bottom of column 170 is continually immersed. Tower tank 160 is fluidly coupled to venturi 136, so that the interior of tank 170 experiences the vacuum drawn through venturi 136 by operation of pump 132.

Operation of system 100 may be understood as follows. The perfect vacuum—0 mm Hg absolute—will raise and support a column of liquid whose height is dictated by the density of the liquid corrected for its vapor pressure; that is, the inherent vapor pressure of the liquid opposes the vacuum and, in exerting pressure on the top of the liquid column, limits the height to which the column may be raised by vacuum. Furthermore, the continuous release of gas from the liquid column—representing gas removed from solution as well as the inherent vapor pressure of the liquid—imposes the requirement of a continuously applied vacuum in order to maintain and support the column at a relatively constant height.

Because the height to which a liquid may be raised by a vacuum is limited, the liquid will not enter the vacuum system so long as the latter is coupled to the column above this maximum equilibrium height. If the liquid is water free of dissolved or ionized gases, a perfect vacuum can draw a column no higher than 33.96 feet above the supply point of the water at 68° F. Any water introduced into "head space" between the top of the column and the vacuum coupling point will fall onto the column (without being drawn into the vacuum source) because the introduced water is above the maximum sustainable height, and the top of the column of water will remain at that height. If the temperature of the water were to be increased so as to raise its vapor pressure, the column of water would decrease in height for the reasons explained above.

Thus, the height of column pipe 170 is chosen such that, with vessel 140 at a desired fill level (with the surface of liquid $L_E$ above the bottom of pipe 170), the distance between the surface of liquid $L_E$ and the floor 164 of tower tank 160 is about 34 feet. As a result, activation of driving subsystem 120 draws a column of liquid to the top of column pipe 170. In general, pump 150 operates at relatively high speed (e.g., on the order of 50–400 gal/min) and a typical diameter for column pipe 170 is 6 inches. Accordingly, the reason for coupling the pump to vessel 140 is to ensure a continuously adequate supply of liquid when the rate of influent inflow falls below the pumping capacity of pump 150 (as it typically will).

Liquid $L_E$ released into tower tank 160 via inlet 162 interacts with the vacuum as it falls to the floor of tank 160 (i.e., to the top of column pipe 170). Sufficient distance (typically about 6 feet) is maintained between inlet 162 and floor 164 to permit an adequate degree of interaction, since it is this interaction that strips gas from the entering liquid. Degasification occurs with high efficiency due to the height at which it is carried out, since at this height the full force of the vacuum generated by driving subsystem 120 is utilized to maintain very low pressure around the incoming liquid and liberate gas therefrom. The smallest achievable system pressure is limited by the vapor pressure of the supplied liquid (and so is lower for liquids having higher concentrations of dissolved species).

With this arrangement, pump 150 need not be particularly powerful, since the only resistance it experiences arises from the entrance loss through inlet 162 and the small head imposed by the distance between inlet 162 and the surface of the liquid in column 170. The effluent liquid reaching vessel 140 through column 170 is free of gas, so that the contents of vessel 140 are always free of gas; consequently, degassed effluent liquid may be continuously withdrawn through port 142 by a simple overflow arrangement. The combination of overflow effluent discharge and coupling of pump 150 to vessel 140 as well as the influent source results in a system requiring essentially no external control for operation.

As gas is drawn from the influent liquid in tower assembly 155 into venturi 136, it enters the recirculating liquid $L_R$. Eventually this liquid becomes saturated with the gas, which escapes (or is conducted away) from vessel 125 through vent 127. Liquid $L_R$ may include biology for processing one or more components of the stripped gas. For example, Beggiatoa and/or Thiobacillus and/or Thiothryx may proliferate under conditions that oxidize hydrogen sulfide to elemental sulfur; Nitrosomonas may proliferate under conditions that oxidize ammonia to nitrous acid (nitrite) with or without concurrent proliferation of Nitrobacter, which converts nitrous acid to nitric acid (nitrate).

All flow-path components are stainless steel or PVC pipe of appropriate diameter to the application. Relatively high throughput can be obtained using system components that impose a relatively small "footprint."

Figure 1B:
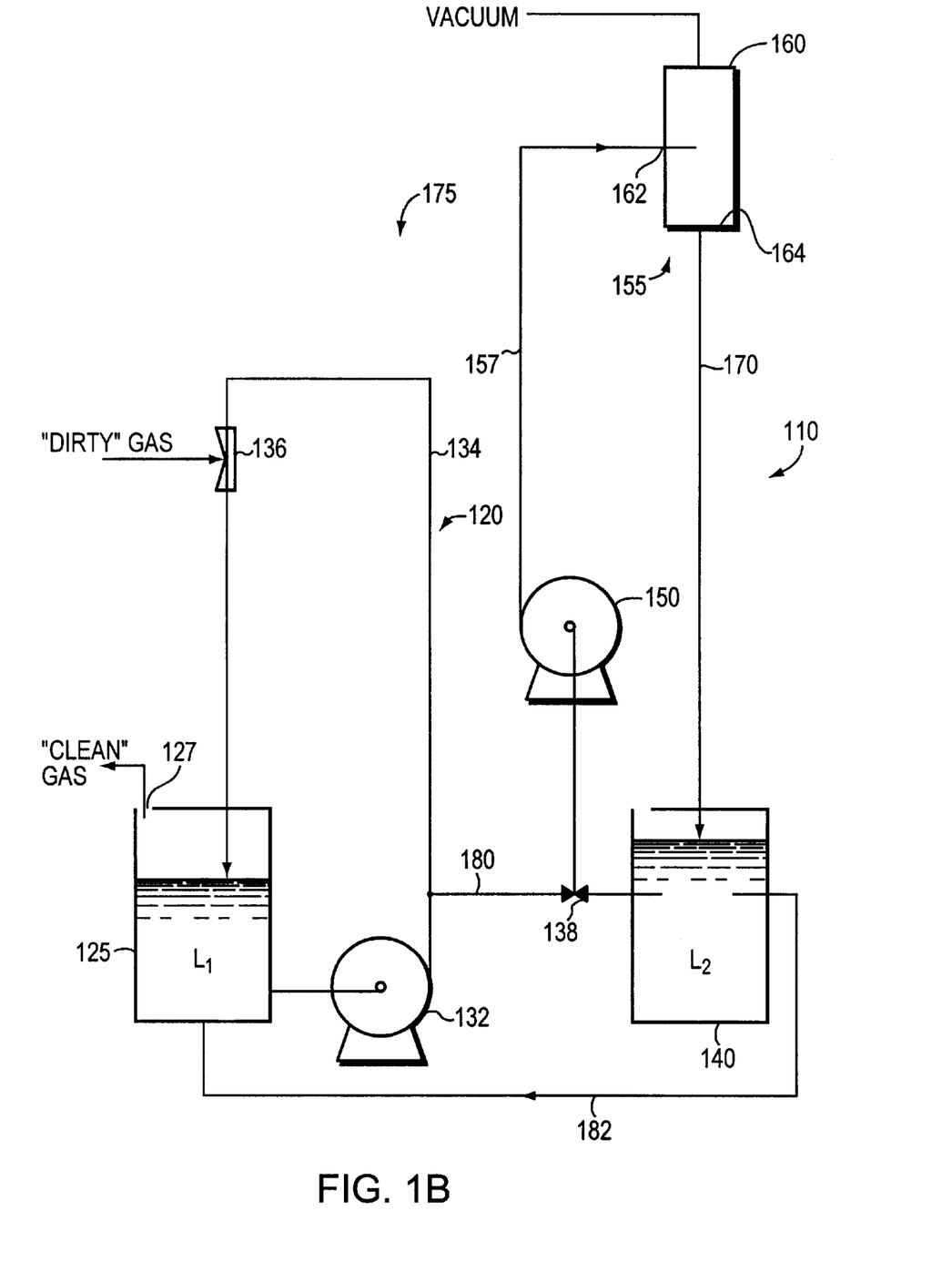

The illustrated system can be modified to effect cleaning of a gaseous influent stream rather than a liquid stream. A representative configuration for gas cleaning is shown in FIG. 1B, and for explanatory purposes the ensuing discussion will assume an application involving removal of carbon dioxide from a liquid or from a gas stream without net chemical consumption or chemical addition. For example, some industrial wastewater treatment systems utilizing aerobic biology are fully enclosed. The microorganisms generate carbon dioxide, which must be continually removed to maintain an oxygenated environment. In systems that employ air stripping, the oxygen supplied to the system exceeds considerably the amount actually required for biological consumption because the oxygen is also used as the $CO_2$ stripping gas. If the $CO_2$ level is allowed rise excessively, the combination of reduced pH and oxygen depletion will cause the biological processes to shut down.

In the illustrated system 175, waste digestion, which occurs in an external treatment apparatus (not shown), produces a "dirty" gas including $CO_2$. Subsystem 120, rather than driving the operation of gas-removal subsystem 110, is instead used to draw digestion gases into flow path 134 and, thereby, into the liquid $L_1$ contained in vessel 125. The liquid $L_1$ contains a compound, such as sodium carbonate, that is reactive with $CO_2$ so as to enhance its solubility in $L_1$. As $CO_2$ enters $L_1$, it dissolves and reacts with sodium carbonate to form carbonic acid and sodium bicarbonate. A portion of the recirculating liquid $L_2$—generally 2–5% of the flow—is diverted via a flow path 180 to gas-removal subsystem 110, which is driven not by subsystem 120, but instead by another source of vacuum as indicated; preferably this is a substantial duplicate of subsystem 120 configured as shown in FIG. 1A, but may be another vacuum system as desired.

The gas-laden liquid $L_1$ entering valve 138 is degassed in tower assembly 155 as discussed above. As a result, the liquid $L_2$ entering vessel 140 through column 170 contains primarily sodium carbonate rather than sodium bicarbonate. A portion of this liquid is returned via a flow path 182 to vessel 125.

In operation, differential gas solubility (preferably augmented by reactivity) ensures that virtually all of the unwanted component of the "dirty" gas will enter liquid $L_1$, while acceptable gas components will not. Thus, in the system under discussion, the gas stream from the digester contains both carbon dioxide and oxygen. Carbon dioxide is substantially more soluble than oxygen in water, a differential that is strongly enhanced by the presence of sodium carbonate in $L_1$. As a result, virtually all of the carbon dioxide and very little of the oxygen from the incoming gas stream enters $L_1$ before the liquid reaches vessel 125, and the atmosphere in the head space of vessel 125 is almost entirely pure oxygen. The carbon dioxide is removed in subsystem 110 and discharged as appropriate.

An apparatus for performing the two-stage phosphate-removal process described above is illustrated in FIG. 2. The system 200 once again includes gas-removal and driving subsystems 210, 220, respectively. In subsystem 220, a pressurized tank 225 contains a liquid $L_1$. A pump 232 draws liquid from vessel 225 along a flow path 234, which leads through a gas venturi 236 and a liquid venturi 238. Gas venturi 236 is fluidly coupled to a tower assembly 255 so as to provide the motive vacuum force thereto. Once again, tower assembly 255 comprises a tower tank 260 having an inlet 262 spaced above its floor 264. A tower column pipe 270 leads back to a vessel 240, and a pump 250 draws liquid from vessel 240 and from a second vessel 280 (via a valve 238) to tower assembly 255. A portion of the liquid $L_2$ in vessel 240, balancing the influent entering subsystem 210 from vessel 280, is discharged through an outlet 242. The effluent passes through a screen (or other suitable apparatus such as a size-exclusion filter, a gravity clarifier, etc.) 282, which separates a solid fraction from the liquid.

Figure 2:
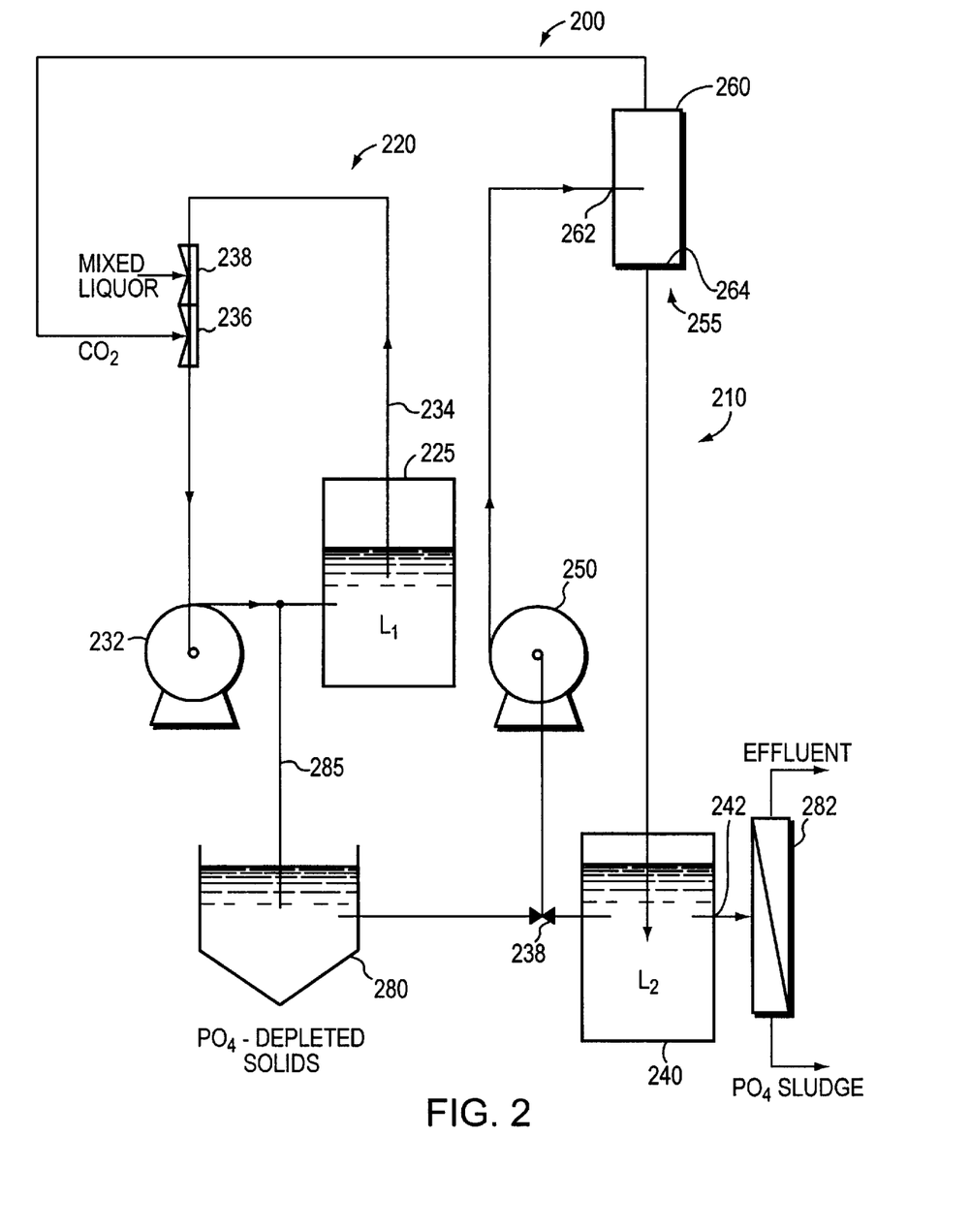
FIG. 2 schematically illustrates a two-stage system for removal of one or more selected impurities using degasification to alternately enhance and reduce solubility.

Vessel 280 receives a portion of the fluid from flow path 234 via a flow path 285. Again, the flow through path 285 substantially matches that exiting vessel 280 into subsystem 210, and that exiting vessel 240 through outlet 242.

In operation, venturi 238 is used as a liquid suction pump to draw mixed liquor from a waste-digestion process (not shown) into the flow path 234. The mixed liquor contains phosphates, which must be removed to maintain the efficiency of waste digestion, and dissolved carbon dioxide and carbonates. Venturi 236 draws $CO_2$ from gas-removal subsystem 210 (as described below) and reintroduces this into the recirculating mixed liquor $L_1$, thereby lowering its pH and further solubilizing phosphates as well as raising the pressure in tank 225 (which may be kept below a predetermined maximum using a pressure-regulated vent). The elevated pressure acts to increase the solubility of carbon dioxide, thereby further lowering pH and, as a consequence, solubilizing phosphates.

The phosphate-rich mixed liquor in vessel 280 contains a phosphate-rich supernatant and a phosphate-depleted solids fraction (typically biological solids). The latter fraction is returned to the source of the mixed liquor. The phosphate-rich supernatant is conveyed into subsystem 210 where carbon dioxide is removed. The gas-removal process occurs as described above in connection with FIGS. 1A and 1B. The removed carbon dioxide is reclaimed through introduction into subsystem 220, while its relatively complete removal from the phosphate-rich supernatant drives the phosphates out of solution. Vessel 240 therefore contains a phosphate solids fraction and a phosphate-free supernatant, which emerges as effluent from screen 282.

Figure 3A:
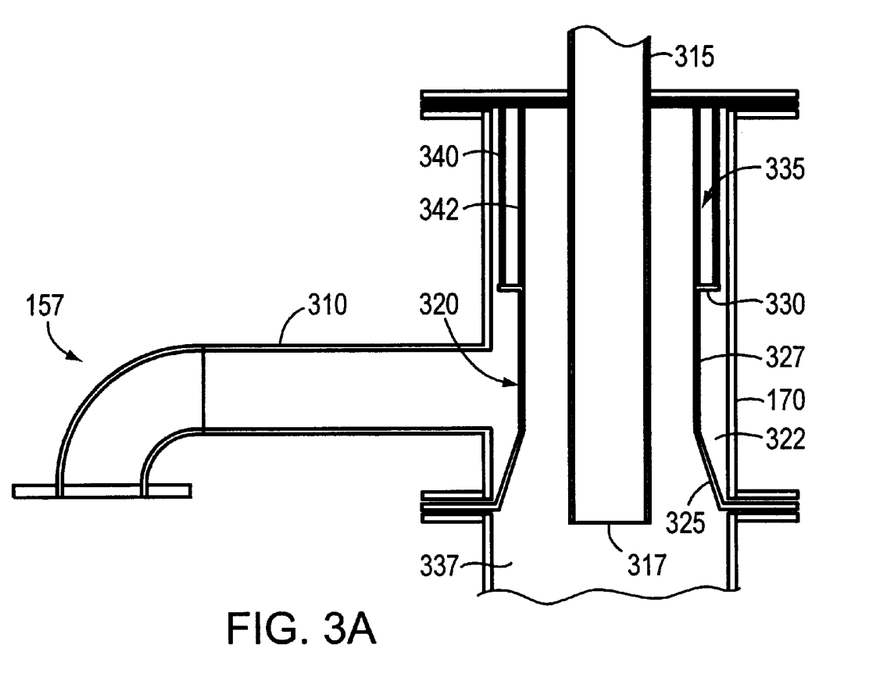
FIG. 3A is a sectional elevation of a spiral entrance arrangement in accordance with the invention.
Figure 3B:
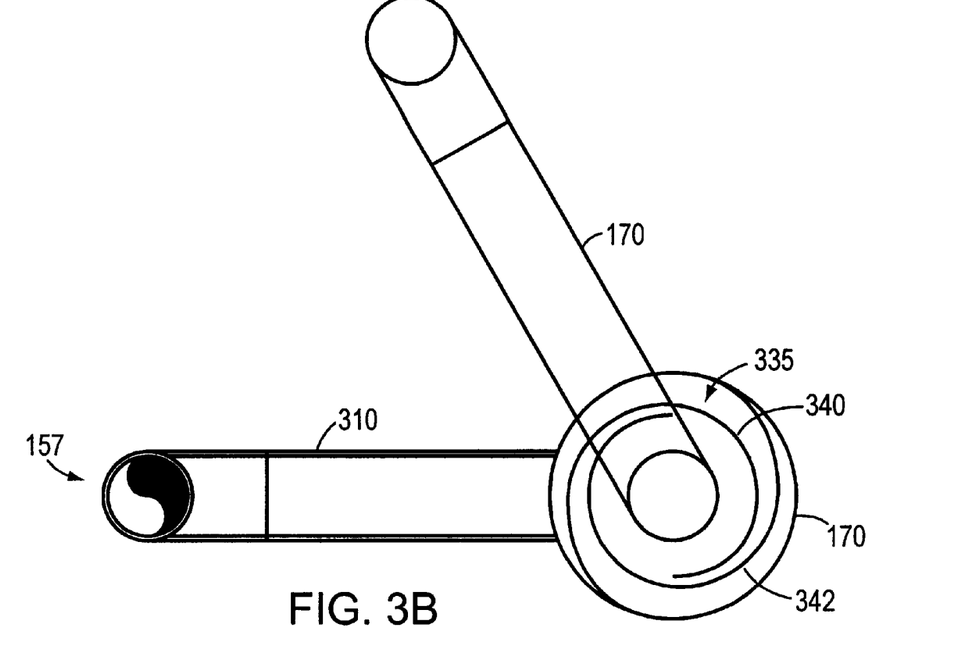
FIG. 3B is a partially cutaway bottom view of the entrance arrangement shown in FIG. 3A.

FIGS. 3A and 3B illustrate a preferred configuration of the inlet to the tower tank. With reference to FIG. 3A, entry flow path 157 (see FIGS. 1A, 1B) terminates in an inlet pipe 310 leading into column pipe 170. Projecting into column pipe 170 is a vacuum conduit 315, which is coupled to the source of vacuum. The bottom opening 317 of conduit 315 is above the maximum attainable height of the water column. At the entrance where inlet pipe 310 joins column pipe 170, a concentric fixture 320 within column pipe 170 forms therein an annular chamber 322. Fixture 320 includes a flared skirt 325 that is joined to the interior wall of column pipe 170, a cylindrical segment 327, and a flange 330 whose outer rim is spaced from the interior wall of column pipe 170; all of these fixture segments define the volume of chamber 322. Resting on the lip of flange 330 is a set 335 of spiral vanes that restrict acces to the interior region 337 of column pipe 170 (which is subjected to vacuum via conduit 315).

As shown in FIG. 3B, the vane arrangement 335 comprises two vanes 340, 342, each of which is a segment of an Archimides spiral. Vanes 340, 342 join the interior wall of column pipe 170 at diametrically opposed locations, and the centers of the spirals defined by the vanes are slightly offset with respect to the center of pipe 170.

Liquid entering chamber 322 rises past shelf 130 and encounters vane arrangement 335, which it must traverse in order to enter vacuum region 337. As a result, the liquid enters vacuum region 337 in a spinning fashion. Nonetheless, the spiral vane arrangement 335 serves to keep turbulence relatively low, so the beneficial mixing in vacuum region 337 is achieved without significant entrance energy requirements. As the liquid passes through the portion of region 337 defined by skirt 325, it expands, the rotational and radial velocities of the liquid enhancing surface-area contact with the vacuum.

Figure 4A:
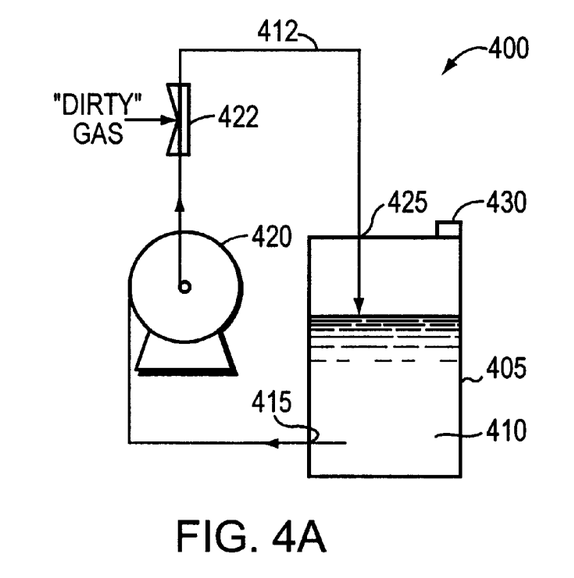
FIGS. 4A and 4B schematically illustrate single- and dual-tank configurations, respectively, of gas-separation systems that operate using pressure-induced shifts in relative gas solubilities.
Figure 4B:
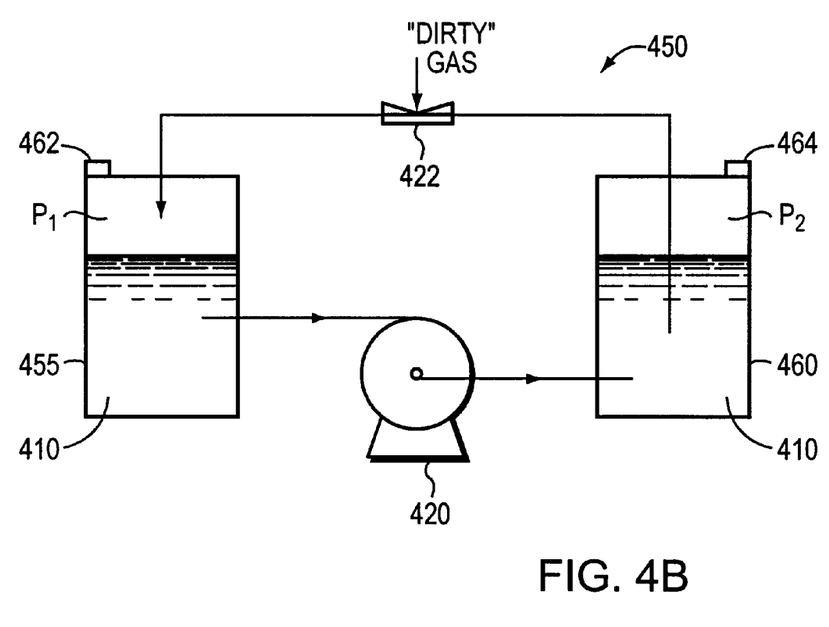

FIGS. 4A and 4B illustrate implementations utilizing pressure to reactively process a gas stream so as to remove one or more components therefrom. These implementations may exploit the nonlinearities associated with Henry's law at elevated pressures. Henry's law describes the behavior of dilute, non-ideal solutions in which the partial pressures of solvent and solute are not directly given by their relative concentrations. Instead, the partial pressure of the dilute solute is proportional, but not equal, to its mole fraction, and is given by the product of the mole fraction with a constant (Henry's constant) no greater than 1 and specific to the solvent-solute system.

It is found that Henry's constant varies with pressure. Moreover, the proportionality constant does not take into consideration any ionization or other reaction of the dissolved gas (which is then no longer the gas in solution). Thus, for oxygen, nitrogen, methane, argon, and other non-reactive gases, Henry's law specifies the maximum amount of the gas that can be dissolved in a given medium at a particular system temperature and partial pressure of the gas; for reactive gases, the ionization and reactive equilibria (which increase the effective solubility) must also be taken into account. By using pressure to vary the solubilities of two gases in a stream under different conditions or in different environments, the invention facilitates segregation of the gases for different purposes.

With reference to FIG. 4, a single-tank system 400 comprises a vessel 405 containing a liquid 410. A recirculation flow path 412 leads out of the vessel 400 through an outlet port 415. A pump 420 drives the liquid at sufficient velocity to develop a gas suction at a venturi 422. The liquid, with gas entrained and/or dissolved therein, re-enters vessel 405 via an inlet port 425. Vessel 405 communicates with the atmosphere by way of a pressure-regulated vent 430, which governs the maximum pressure in vessel 405. In general, the liquid 410 will contain a material that reacts with, or catalyzes reaction of, one or more of the gas components but not another (or others). The reaction may be assisted by another, less-soluble gas component.

In a representative implementation, a mixed-species "dirty" gas comprising hydrogen sulfide and oxygen (drawn, for example, from an aeration plant for well water) enters venturi 415. At 20° C., $H_2S$ is approximately 80 times more soluble in water than $O_2$, and as a result, $H_2S$ preferentially dissolves in an aqueous liquid 410. Dissolution is assisted through the inclusion, in liquid 410, of conventional biological solids (e.g., as set forth above) that oxidize $H_2S$ into elemental sulfur in the presence of oxygen. Although some of the oxygen escapes through vent 430, it contains little $H_2S$, since this is substantially absorbed into the liquid. The presence of oxygen in the head space of vessel 405 assists the biological oxidation of $H_2S$ by the bacteria in liquid 410, and the system configuration ensures that the recirculating liquid 410 experiences sufficient residence time within vessel 405 to avoid overwhelming the bacteria (thereby reducing both the efficiency of the process and the uptake of $H_2S$ by the liquid) and the ensure complete reaction therewith. Moreover, because of the non-equilibrium nature of the process, the oxygen supply is never depleted.

More subtly, at pressures of 70–80 PSI, the solubility disparity between $O_2$ and $H_2S$ diminishes. As a result, a greater fraction of oxygen is driven into liquid 410 than would be the case at atmospheric pressure, enhancing the effectiveness of the biology and therefore the efficiency of $H_2S$ oxidation. (In fact, bacterial efficiency is generally found to be proportional to the square of the oxygen partial pressure.) At a minimum, this effect on Henry's law reduces the necessary size of the vessel 405; and in some circumstances, may represent the factor that prevents depletion of oxygen from liquid 410 from eventually shutting down the biological reduction altogether. Moreover, because $H_2S$ remains 15–20 times more soluble in water even at the elevated pressure levels mentioned above, the fraction of $H_2S$ exiting vessel 405 through vent 430 is relatively small.

It has been found that the $H_2S$-consuming bacteria can be replaced with iron or iron compounds, which act catalytically. Ferrous ($Fe^{2+}$) compounds react with $H_2S$ to form FeS, which, in the presence of oxygen, itself reacts to form $Fe_2S_3$. That compound, in turn, decomposes into ferrous ion and elemental sulfur. Similar action may be obtained through use of copper, cobalt, and their compounds.

The two-tank system 450 shown in FIG. 4B facilitates separate venting of different gaseous components and greater degrees of component partitioning. In this case, a first vessel 455 develops a head-space pressure $P_1$ while a second vessel 460 develops a head-space pressure $P_2$. The pressures in vessels 455, 460 are controlled by pressure-regulated vents 462, 464, respectively. To process a gas stream comprising $H_2S$ and $O_2$, $P_2$ is set to exceed $P_1$ (e.g., $P_1$ is atmospheric pressure and $P_2$ is 70–80 PSI). Once again, when "dirty" gas enters the motive fluid 410 through venturi 422, virtually all of the $H_2S$ goes into solution, and so is not found in the gas (or gas mixture) exiting vessel 455 through vent 462. At the higher pressure $P_2$ in vessel 460, the exiting gas mixture is richer in $H_2S$.

It will therefore be seen that the foregoing approaches to degasification and manipulation of solubilities can be conveniently applied to a variety of different environments. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of degassing a solution having a vapor pressure, the method comprising the steps of:
   a. driving the solution to a subatmospheric pressure;
   b. maintaining the subatmospheric pressure notwithstanding evolution of gas from the solution by applying, without contact, a continuous vacuum to the solution, the continuous vacuum drawing the solution into a column to a maximum physically attainable height; and
   c. degassing by feeding the solution into the vacuum above the column.

2. The method of claim 1 wherein the solution comprises at least one ionic species in equilibrium with a dissolved gas, degassing precipitating an ionic species by preventing chelation.

3. The method of claim 1 wherein the solution comprises a substance present as a dissolved gas in equilibrium with at least one non-gas dissolved species, maintenance of the subatmospheric pressure driving the equilibrium toward the dissolved gas, removal of which depletes the solution of the substance without addition of solids.

4. The method of claim 3 wherein the substance is a halogen.

5. The method of claim 1 wherein the solution comprises a dissolved reactive gas in equilibrium with a non-volatile soluble species formed therefrom, degassing decreasing the concentration of the non-volatile soluble species.

6. The method of claim 5 wherein the dissolved reactive gas and the non-volatile soluble species are selected from the group consisting, respectively, of (a) gases that are dibasic or reversibly react with water to form dibasic acids, and (b) a corresponding dibasic acid salt.

7. The method of claim 6 wherein:
   a. the gases that are dibasic or reversibly react with water to form dibasic acids are themselves selected from the group consisting of carbon dioxide, hydrogen sulfide, hydrogen selenide, carbon oxysulfide, carbon disulfide, and sulfur dioxide; and
   b. the corresponding dibasic acid salt is selected from the group consisting of (i) a carbonate salt of at least one of ammonia, barium, calcium, chromium, iron, lithium, magnesium, manganese, nickel, potassium, sodium, strontium, and zinc; (ii) a divalent salt of hydrogen sulfide and ammonia, calcium, lithium, potassium, sodium, or strontium; (iii) a divalent salt of hydrogen selenide and ammonia, lithium, potassium, and sodium; (iv) a thiocarbonate alkaline earth metal or alkali metal salt of carbon oxysulfide; (v) a dithiocarbonate alkaline earth metal or alkali metal salt of carbon disulfide; and (vi) a sulfite salt of ammonia, calcium, lithium, magnesium, potassium, sodium, or strontium and sulfur dioxide.

8. The method of claim 5 further comprising the steps of:
   a. prior to degassing, drawing a gas mixture into the solution, the gas mixture containing the reactive gas which reacts to form the non-volatile soluble species, the reactive gas substantially fully entering solution;
   b. venting components of the gas mixture that have not entered solution;
wherein
   c. degassing reduces the concentration of the non-volatile soluble species, thereby increasing the capacity of the solution for uptake of the reactive gas.

9. The method of claim 8 wherein:
   a. the reactive gas is drawn into the solution and the other gas components are vented in a first recirculating subsystem;
   b. the solution is degassed in a second recirculating subsystem; and
   c. a portion of the solution from the first subsystem is continually conveyed to the second subsystem, and a balancing portion of the degassed solution from the second subsystem is returned to the first subsystem.

10. The method of claim 9 wherein the first subsystem comprises a venturi for drawing the gas mixture into the solution, and the second subsystem comprises a vacuum system for applying, without contact, a continuous vacuum to the solution.

11. The method of claim 1 further comprising the steps of:
   a. creating the vacuum by recirculating liquid through a venturi, the venturi being fluidly coupled to the solution above a surface of the column at the maximum physically attainable height; and
   b. degassing by feeding the solution into the vacuum above the surface of the column.

12. The method of claim 11 wherein the venturi is powered by a recirculating stream of liquid, the recirculating liquid comprising a material for reacting with gas drawn from the solution.

13. The method of claim 12 wherein the material comprises microorganisms.

14. The method of claim 11 wherein the solution to be degassed is fed through a set of spiral vanes that cause the solution to spin at high velocity.

15. The method of claim 1 further comprising the steps of:
   a. in a first subsystem,
      i. providing an aqueous mixture comprising a solids fraction and an unwanted, partially dissolved component;
      ii. introducing a solubilizing gas into the mixture to further solubilize the unwanted component;
      iii. removing the solids fraction substantially free of the unwanted component to yield the solution to be degassed;
   b. performing the degassing steps in a second subsystem, the degassing step producing the solubilizing gas and precipitating the unwanted component;
   c. separating the unwanted component; and
   d. feeding the solubilizing gas obtained by degassing into the first subsystem.

16. The method of claim 15 wherein the first subsystem comprises:
   a. a first venturi for drawing the aqueous mixture into the first subsystem;
   b. means for recirculating the mixture through the first subsystem; and
   c. a second venturi fluidly coupled to the second subsystem for creating therein a continuous vacuum, the continuous vacuum drawing the solution in a column to a maximum physically attainable height, the degassing being accomplished by feeding the solution into the vacuum above the surface of the column.

17. The method of claim 16 wherein the solution to be degassed is fed through a set of spiral vanes that cause the solution to spin at high velocity.

18. The method of claim 15 wherein the unwanted, partially dissolved component of the aqueous mixture is:
   a. (i) selected from the group consisting of phosphates, sulfates, arsenates, arsenites, and carbonates of a divalent, trivalent, or tetravalent metal and (ii) rendered soluble by addition of carbon dioxide or sulfur dioxide; or
   b. at least one divalent or polyvalent metal salt rendered soluble by addition of ammonia to form chelation complexes.

19. Apparatus for degassing a solution having a vapor pressure, the apparatus comprising:
   a. means for driving the solution to a subatmospheric pressure;
   b. means for maintaining the subatmospheric pressure notwithstanding evolution of gas from the solution, said means comprising a vacuum apparatus configured to apply, without contact, a continuous vacuum to the solution, the continuous vacuum drawing the liquid to a maximum physically attainable height and
   c. a feeder for introducing the solution into the vacuum above said height to effect degassing of the solution.

20. The apparatus of claim 19 wherein the solution comprises a substance present as a dissolved gas in equilibrium with at least one non-gas dissolved species, maintenance of the subatmospheric pressure driving the equilibrium toward the dissolved gas, removal of which depletes the solution of the substance without addition of solids, the apparatus further comprising:
   a. means for drawing a gas mixture into the solution prior to degassing, the gas mixture containing a reactive gas which reacts to form a non-volatile soluble species, the reactive gas substantially fully entering solution; and
   b. means for venting components of the gas mixture that have not entered solution;
wherein
   c. degassing reduces the concentration of the non-volatile soluble species, thereby increasing the capacity of the solution for uptake of the reactive gas.

21. The apparatus of claim 20 further comprising:
   a. a first recirculating subsystem in which the reactive gas is drawn into the solution and the other gas components are vented in; and
   b. a second recirculating subsystem in which the solution is degassed, a portion of the solution from the first subsystem being continually conveyed to the second subsystem, and a balancing portion of the degassed solution from the second subsystem being returned to the first subsystem.

22. The apparatus of claim 21 wherein the first subsystem comprises a venturi for drawing the gas mixture into the solution, and the second subsystem comprises a vacuum system for applying, without contact, a continuous vacuum to the solution.

23. The apparatus of claim 19 wherein:
   a. the vacuum apparatus comprises a venturi through which liquid is recirculated to create the vacuum, the venturi being fluidly coupled to the solution above a surface thereof at the maximum physically attainable height; and
   b. degassing is accomplished by feeding the solution into the vacuum above the surface of the column.

24. The apparatus of claim 23 further comprising a recirculating stream of liquid powering the venturi, the recirculating liquid comprising a material for reacting with gas drawn from the solution.

25. The apparatus of claim 23 further comprising a set of spiral vanes, the solution to be degassed being fed through the vanes to thereby cause the solution to spin at high velocity.

26. The apparatus of claim 19 further comprising:
   a. a first subsystem configured to:
      i. provide an aqueous mixture comprising a solids fraction and an unwanted, partially dissolved component;
      ii. introduce a solubilizing gas into the mixture to further solubilize the unwanted component; and
      iii. remove the solids fraction substantially free of the unwanted component to yield the solution to be degassed;

b. a second subsystem for performing the degassing, the degassing producing the solubilizing gas and precipitating the unwanted component;

c. means for separating the unwanted component; and d. means for feeding the solubilizing gas obtained by degassing into the first subsystem.

27. The apparatus of claim 26 wherein the first subsystem comprises:

a. a first venturi for drawing the aqueous mixture into the first subsystem;

b. means for recirculating the mixture through the first subsystem; and c. a second venturi fluidly coupled to the second subsystem for creating therein a continuous vacuum, the continuous vacuum drawing the solution in a column to a maximum physically attainable height, the degassing being accomplished by feeding the solution into the vacuum above the surface of the column.

28. The apparatus of claim 27 further comprising a set of spiral vanes, the solution to be degassed being fed through the vanes to thereby cause the solution to spin at high velocity.

* * * * *